United States Patent [19]

Neuzil et al.

[11] 4,333,770
[45] Jun. 8, 1982

[54] EXTRACTION OF SUCROSE FROM MOLASSES

[75] Inventors: Richard W. Neuzil, Downers Grove; Richard L. Fergin, Mount Prospect, both of Ill.

[73] Assignee: UOP Inc., Des Plaines, Ill.

[21] Appl. No.: 185,101

[22] Filed: Sep. 8, 1980

[51] Int. Cl.$^3$ ............................................... C13D 3/12
[52] U.S. Cl. .................................. 127/46.3; 127/55; 210/674; 210/692
[58] Field of Search ................... 127/46 R, 46 B, 55; 210/673, 674, 692, 691

[56] References Cited

U.S. PATENT DOCUMENTS

| | | | |
|---|---|---|---|
| 2,985,589 | 5/1961 | Broughton et al. | 210/34 |
| 3,040,777 | 6/1962 | Carson et al. | 137/625.15 |
| 3,214,293 | 10/1965 | Mountfort | 127/46.3 |
| 3,422,848 | 1/1969 | Liebman et al. | 137/625.15 |
| 3,706,812 | 12/1972 | deRosset et al. | 260/674 SA |
| 3,720,626 | 3/1973 | Benzaria et al. | 210/674 X |
| 3,935,006 | 1/1976 | Fischer | 210/674 X |
| 4,051,079 | 9/1977 | Melby | 210/674 X |
| 4,064,043 | 12/1977 | Kollman | 127/55 X |
| 4,101,338 | 7/1978 | Rapaport et al. | 127/46.3 |
| 4,147,624 | 4/1979 | Modell | 210/674 X |

FOREIGN PATENT DOCUMENTS 209093 7/1957 Australia .......................... 127/46.3

OTHER PUBLICATIONS

Kunin, R.; Amber-Hi-Lites, Porous Polymers as Adsorbents-a Review of Current Practice; Rohm & Haas Co., Fluid Process Chemicals Dept., Phil., Pa. No. 163, Winter 1980.

*Primary Examiner*—Kenneth M. Schor
*Attorney, Agent, or Firm*—James R. Hoatson, Jr.; Raymond H. Nelson; William H. Page, II

[57] ABSTRACT

Various sugars and particularly sucrose may be separated from mixtures of sugars including glucose, fructose, raffinose, etc. by treating an aqueous solution of the sugar source containing these sugars with an adsorbent which will selectively adsorb sucrose thereon. Thereafter the sucrose may be desorbed from the adsorbent by treatment with a desorbent material. In the process of the present invention the adsorbent will comprise a shaped replicate of a particle aggregate comprising a carbonaceous pyropolymer containing recurring units of at least carbon and hydrogen atoms while the desorbent material will comprise an aqueous alcoholic solution. The preferred alcohols contain methanol and ethanol and will be present in the aqueous alcoholic solution in an amount in the range of from about 10% to about 50% by weight.

4 Claims, No Drawings

EXTRACTION OF SUCROSE FROM MOLASSES

BACKGROUND OF THE INVENTION

Sucrose, which is a common form of sugar, is widely used in the food industry. The usual source for this compound is found in the juice of sugar cane, sugar beets and other sucrose-containing materials. After the readily recoverable sucrose has been extracted from these sources, the mother liquors which are generally termed "molasses" will still contain a relatively large amount of sucrose along with other sugars such as glucose, fructose, raffinose, etc. The latter compounds constitute crystallization inhibitors which make the recovery of the remaining sucrose difficult to accomplish and thus make the recovery of the sucrose no longer economically practical. In addition, the impurities which are present impart a taste to the molasses which renders the same inedible for human consumption.

Sugar beet molasses may contain approximately 50% sucrose and, therefore, it is highly desirable to extract this sucrose from the aforesaid molasses. Inasmuch as hereinbefore set forth, the molasses is bitter to human taste, the residual molasses is used in animal feed or as a fertilizer, and therefore a relatively low sucrose content is an acceptable feature of the molasses. At the present time there are only a few methods for extracting the sucrose present in molasses from the compounds of the type hereinbefore set forth. One such process which is utilized is the Steffan's process in which the beet molasses is diluted to about 20% solids, refrigerated, and treated with a calcium compound such as calcium oxide. This results in the reaction of the sucrose present with a calcium oxide to form tricalcium sucrate which is an insoluble granular precipitate. This precipitate can then be removed from the diluted molasses solution by filtration followed by washing, to remove adhering impurities. The tricalcium sucrate is returned to the beet processing operation by adding to the incoming hot beet juice. Under such conditions the tricalcium sucrate decomposes, releasing the sucrose to solution so that the calcium oxide has acted as a purification agent. However, a disadvantage which is inherent in the process is that certain impurities are recycled, particularly raffinose, which is a trisaccharide. With the continual recycling of the tricalcium sucrate the amount of raffinose present begins to accumulate and, as hereinbefore discussed, will retard the desired crystallization of the sucrose, thus making it necessary to discard a certain amount of circulating molasses from time to time.

In addition to the Steffan process it is also possible to separate sucrose by utilizing non-continuous chromographic procedures which employ ion exchange resins to isolate sucrose from the molasses. However, neither of the procedures results in a complete separation of the sucrose even though high purity can be obtained. One of the processes employs a strong acid, polystyrene ion exchange resin in the potassium form while the other process uses the calcium form of a similar resin. A disadvantage which is present in both processes lies in the fact that both processes require periodic back-flushing and regeneration of the ion exchange resin.

It has now been discovered that sucrose may be separated and recovered from other sugars present in molasses by an adsorption—desorption technique utilizing, as the adsorbent therefor, shaped replications of particle aggregates.

DETAILED DESCRIPTION OF THE INVENTION

This invention relates to a process for separating sucrose from a sugar source containing a mixture of sucrose and at least one other sugar. More specifically, the invention is concerned with a process for separating and recovering sucrose from a sugar source and still permitting the source such as molasses to be utilized in other fields such as for fertilizers or animal feed. However, the presence of other sugars which act as crystallization inhibitors make the recovery of sucrose relatively difficult to accomplish. It is therefore necessary that sucrose be separated from these crystallization inhibitors in order to facilitate the recovery thereof. Accordingly, it is the object of this invention to provide an improved process for the recovery of sucrose from a sugar source containing impurities therein.

In one aspect an embodiment of this invention will lie in a process for separating sucrose from an aqueous mixture of a sugar source containing sucrose and at least one other sugar which comprises the steps of: (a) contacting said mixture at adsorbent conditions with an adsorbent comprising a shaped replication of particle aggregates consisting of a carbonaceous pyropolymer containing at least carbon and hydrogen atoms thereby selectively adsorbing said sucrose thereon; (b) removing from the adsorbent a raffinate stream comprising at least one other sugar; (c) contacting said adsorbent at desorption conditions with a desorbent material comprising an aqueous alcoholic solution to effect desorption of said sucrose from said adsorbent, and (d) removing from said adsorbent an extraction stream comprising said sucrose.

A specific embodiment of this invention is found in a process for separating sucrose from a sugar source such as molasses which contains sucrose and at least one other sugar such as glucose, fructose, and raffinose which comprises contacting said molasses at a temperature in the range of from about 20° to about 200° C. and a pressure in the range of from about atmospheric to about 500 psig with an adsorbent comprising a shaped replication of particle aggregates consisting of a carbonaceous pyropolymer possessing recurring units containing at least carbon and hydrogen atoms to selectively adsorb said sucrose, removing from the adsorbent a raffinate stream containing at least one other sugar, contacting the adsorbent at a temperature in the range of from about 20° to about 200° C. and a pressure in the range of from about atmospheric to about 500 psig with an aqueous methanol solution containing from about 10% to about 50% by weight of methanol to effect the desorption of sucrose from the adsorbent, and removing from said adsorbent an aqueous stream of sucrose.

Other objects and embodiments will be found in the following further detailed description of the invention.

As hereinbefore set forth, the present invention is concerned with a process for separating sucrose from an aqueous mixture containing sucrose and at least one other sugar. The process is effected by passing a feed mixture containing one or more components of an adsorbent of the type hereinafter set forth in greater detail. The passage of the feed stream over the adsorbent will result in the adsorption of sucrose while permitting the other components of the feed stream to pass through the treatment zone in an unchanged condition thereafter the sucrose will be desorbed from the adsorbent by treating the adsorbent with a desorbent material.

It has now been discovered that an effective desorbent material which may be employed to desorb the sucrose from the adsorbent comprises an aqueous alcoholic solution. Inasmuch as lower molecular alcohols such as methanol or ethanol are both hydrophobic and organophilic they will possess the ability to displace the sucrose from the surface of the adsorbent and yet are soluble in water. The methanol or ethanol will be present in the aqueous solution in an amount in the range of from about 10% to about 50% by weight, this concentration insuring the fact that the sucrose will still be soluble in the aqueous alcoholic solution.

For purposes of this invention the various terms which are hereinafter used may be defined in the following manner.

A feed mixture is a mixture containing one or more extract components and one or more raffinate components to be separated by our process. The term "feed stream" indicates a stream of a feed mixture which passes to the adsorbent used in the process.

An "extract component" is a compound or type of compound that is more selectively adsorbed by the adsorbent while a "raffinate component" is a compound or type of compound that is less selectively adsorbed. In this process sucrose is an extract component and the other sugars raffinate components. The term "desorbent material" shall mean generally a material capable of desorbing an extract component. The term "desorbent stream" or "desorbent input stream" indicates the stream through which desorbent material passes to the adsorbent. The term "raffinate stream" or "raffinate output stream" means a stream through which a raffinate component is removed from the adsorbent. The composition of the raffinate stream can vary from essentially 100% desorbent material to essentially 100% raffinate components. The term "extract stream" or "extract output stream" shall mean a stream through which an extract material which has been desorbed by a desorbent material is removed from the adsorbent. The composition of the extract stream, likewise, can vary from essentially 100% desorbent material to essentially 100% extract components. At least a portion of the extract stream and preferably at least a portion of the raffinate stream from the separation process are passed to separation means, typically fractionators, where at least a portion of desorbent material is separated to produce an extract product and a raffinate product. The terms "extract product" and "raffinate product" mean products produced by the process containing, respectively, an extract component and a raffinate component in higher concentrations than those found in the extract stream and the raffinate stream.

The adsorbents which are employed to selectively adsorb sucrose from a mixture of sugars and other crystallization inhibitors such as betaine comprise shaped replications of particle aggregates containing recurring units of at least carbon and hydrogen atoms. The shaped replications are prepared by treating an inorganic support of the desired shape such as spheres, plates, pellets, rods, fibers, monoliths, etc., with a pyropolymer precursor and thereafter pyropolymerizing said precursor by treatment at an elevated temperature which may range from about 400° to about 1200° C. to form at least a monolayer of a carbonaceous pyropolymer possessing recurring units containing at least carbon and hydrogen atoms on the surface of said inorganic support. The carbonaceous pyropolymer will adopt the shape of the inorganic support and thus be a replication of the starting inorganic support material. In the preferred embodiment of the present invention the inorganic support material will be characterized as having a surface area of from 1 to about 500 m$^2$/g, illustrative examples of refractory oxides which may be employed include alumina in various forms such as gamma-alumina, eta-alumina, theta-alumina, or mixtures of inorganic refractory oxides such as zeolites, silica-alumina, silica-zirconia, zirconia-titania, zirconia-alumina, etc.

In one method of preparing the composite, the inorganic support such as a refractory oxide is heated to a temperature of from about 400° to about 1200° C. in a reducing atmosphere containing an organic pyrolyzable compound. The organic pyropolymer precursors most commonly and preferably used for the purposes of this invention are members of the group consisting of aliphatic hydrocarbons, aliphatic halogen derivatives, aliphatic oxygen derivatives, aliphatic sulfur derivatives, aliphatic nitrogen derivatives, organometallic compounds, alicyclic compounds, aromatic compounds, and heterocyclic compounds. Of the aliphatic hydrocarbons, the more common classes which may be utilized to perform this invention are alkanes, alkenes, alkynes, and alkadienes. Ethane, propane, butane and pentane are among the alkanes which may be successfully used in the performance of this invention. Similarly, alkenes which suffice include ethene, propene, 1-butene, 2-butene and 1-pentene. Alkynes which may be successfully used include ethyne, propyne, 1-butyne, 2-pentyne, and 1-hexyne. 1,3-Butadiene and isoprene are included among the alkadienes which may be utilized. Among the aliphatic halogen derivatives which suffice for the purposes of this invention are monohaloalkanes, polyhaloalkanes, and unsaturated halo compounds. In the monohaloalkane subgroup, chloromethane, bromoethane, 1-iodopropane, and 1-chlorobutane may be used. Polyhaloalkanes such as carbon tetrachloride, chloroform, 1,2-dichloroethane and 1,2-dichlorobutane may also be utilized. One unsaturated halo compound which may be utilized is chloroprene.

The aliphatic oxygen derivatives appropriate for use in this invention include the classes of alcohols, ethers, halohydrides and alkene oxides, saturated aldehydes and ketones, unsaturated aldehydes and ketones, ketenes, acids, esters, salts and carbohydrates. Various alcohols which may be utilized include ethanol, 2-butanol, 1-propanol, glycol, (e.g. 1,3-propanediol), and glycerol. Ethers utilized include ethyl ether and isopropyl ether. Appropriate halohydrins and alkene oxides include ethylene chlorohydrin, propylene chlorohydrin, ethylene oxide, and propylene oxide. Suitable saturated aldehydes and ketones include formaldehyde, acetaldehyde, acetone, and ethyl methyl ketone. Unsaturated aldehydes and ketones which may be used include propenol, trans-2-butenal, and butenone. Ketene has also been successfully used as an organic pyrolyzable substance. Likewise, formic acid, acetic acid, oxalic acid, acrylic acid, chloroethanoic acid, formic anhydride and formyl chloride may also be utilized. Ethers such as methyl formate, ethyl formate and ethyl acetate may also be used. Salts such as sodium formate, potassium acetate and calcium propionate may be utilized as may a variety of carbohydrates. The broad classification of aliphatic sulfur derivatives may be broken down into the subclasses of alkanethiols, alkylthioalkanes, sulfonic acids, and alkyl sulfates and alkyl metallic sulfates. Suitable among the alkanethiols are ethyl mercaptan and n-propyl mercaptan. Among the alkylthioalkanes usable are the thio-ethers, alkyl sulfides, methyl sulfide, ethyl sulfide and methyl propyl sulfide. Ethyl sulfonic acid and n-propyl sulfonic acid are sulfonic acids which may also be successfully used. Ethyl sulfate and sodium laurel sulfate are also appropriate for use.

The broad class of aliphatic nitrogen derivatives may be broken down into the subclasses of nitroalkanes, amides, amines, nitriles and carbylamines. Nitroethane and 1-nitropropane are exemplary of suitable nitroalkanes while acetamide and propioamide are among the appropriate amides. Amines such as dimethylamine and ethylmethylamine, nitriles such as acetonitrile and propionitrile, and carbylamines such as ethyl isocyanide may also be used for the organic pyrolyzable substance of this invention. Organometallic compounds such as tetraisopropyl titanate, tetrabutyl titanate and 2-ethylhexyl titanate may also be used.

Particularly appropriate and preferred for use as the organo pyrolyzable substance of this invention are the alicyclic compounds. Foremost among these are cyclohexane and cyclohexene. Aromatic compounds include the subclasses of hydrocarbons, halogen compounds, oxygen derivatives, ethers, aldehydes, ketones, quinones, aromatic acids, aromatic sulfur derivatives, and aromatic nitrogen compounds may also be utilized. Among the many suitable hydrocarbons, benzene, naphthalene, anthracene, and toluene were successfully utilized. Benzyl chloride and benzal chloride are appropriate halogen compounds while phenol, o-cresol, benzyl alcohol and hydroquinone are among the suitable derivatives. Ethers such as anisole and phenetole and aldehydes, ketones, and quinones, such as benzaldehyde, acetophenone, benzophenone, benzoquinone and anthraquinone may also be used. Aromatic acids such as benzoic acid, phenylacetic acid, and hydrocinnamic acid may be utilized while the aromatic sulfur derivative of benzene sulfonic acid will also serve successfully. The aromatic nitrogen compounds of nitrobenzene, 1-nitronaphthalene, aminobenzene and 2-amine toluene may also be successfully used as the organic pyrolyzable substance of this invention. Among the heterocyclic compounds, five member ring compounds such as furan, proline, coumarone, thionaphthene, indole, indigo, and carbazole may be successfully utilized. Six member ring compounds such as pyran, coumarin and acridine may also be utilized.

As can be seen, an extremely wide latitude can be exercised in the selection of the organic pyrolyzable substance, since virtually any organic material that can be vaporized, decomposed and polymerized on the refractory oxide by heating will suffice. The resultant carbonaceous pyropolymer will possess recurring units containing at least carbon and hydrogen atoms, however, depending upon the pyropolymer precursor which has been selected, the pyropolymer may also contain other atoms such as nitrogen, oxygen, sulfur, or metals such as phosphorous, etc.

In another embodiment the composite may be prepared by impregnating the refractory inorganic oxide with a solution of a carbohydrate material such as dextrose, sucrose, fructose, starch, etc., and thereafter drying the impregnated support. After drying, the impregnated support is then subjected to pyrolysis temperatures in the range hereinbefore set forth whereby a carbonaceous pyropolymer similar in nature to those hereinbefore described is formed in at least a monolayer on the surface of the refractory inorganic oxide support.

Following this the inorganic support is then chemically leached from the carbonaceous pyropolymer. The leaching is effected by treating said composite with either an acid or a base thereby forming a high surface area carbonaceous pyropolymer support which is a shaped replication of the original inorganic support. The leaching of the base material of the type hereinbefore set forth may be effected over a wide range of temperatures, said range being from about ambient (20°–25° C.) up to about 250° C. or more for a period of time which may range from less than 1 up to about 72 hours or more. It is to be understood that the operating parameters of the leaching step will vary over a wide range and will be dependent upon a combination of time, temperature, strength of the leaching solution, etc. Examples of acids or bases which may be utilized to leach out the base material, that is, the inorganic support such as a refractory inorganic oxide, will include inorganic acids such as phosphoric acid, sulfuric acid, nitric acid, hydrochloric acid, etc., organic acids such as methyl sulfonic acid, ethyl sulfonic acid, propyl sulfonic acid, toluene sulfonic acid, etc., strong bases such as sodium hydroxide, potassium hydroxide, lithium hydroxide, rubidium hydroxide, cesium hydroxide, etc. It is to be understood that the aforementioned leaching materials are only representative of the class of compounds which may be used and that any chemical which is capable of removing the refractory inorganic oxide while retaining the high surface area of the carbonaceous pyropolymer may be used.

The feed mixtures which are charged to the process of the present invention will comprise sugar sources, a specific source which is utilized in the present invention comprising molasses as hereinbefore discussed such as cane molasses or sugar beet molasses will contain about 50% sucrose as well as other sugars such as glucose, fructose, raffinose as well as inorganic salts and alkaloids, betaine, said other sugars and compounds being present in varying amounts in the sugar source. The adsorbent such as the shaped replications of the present invention have been found to selectively adsorb sucrose while allowing the other components in the sugar source to pass through the system unchanged. In addition, it has also been found that the initial capabilities of the adsorbent to selectively adsorb sucrose is maintained during the actual use in the separation process over an economically desirable life. In addition, as previously set forth, the shaped replications possess the necessary adsorbent character in the ability of the adsorbent to separate components of the feed, that is that the adsorbent possess adsorptive selectivity for one component as compared to other components. Relative selectivity can be expressed not only for one feed compound as compared to another but can also be expressed between any feed mixture component and the desorbent material. The selectivity, (B), as used throughout this specification is defined as the ratio of the components of the two components of the adsorbed phase over the ratio of the same two components in the unadsorbed phase at equilibrium conditions. Relative selectivity is shown as Equation 1 below.

$$\text{Selectivity} = (B) = \frac{[\text{vol. percent } C/\text{vol. percent } D]_A}{[\text{vol. percent } C/\text{vol. percent } D]_U} \quad \text{Equation 1}$$

where C and D are two components of the feed represented in volume percent and the subscripts A and U represent the adsorbed and unadsorbed phases respectively. The equilibrium conditions were determined when the feed passing over a bed of adsorbent did not change composition after contacting the bed of adsorbent. In other words, there was no net transfer of material occurring between the unadsorbed and adsorbed phases. Where selectivity of two components approaches 1.0 there is no preferential adsorption of one component by the adsorbent with respect to the other; they are both adsorbed (or non-adsorbed) to about the same degree with respect to each other. As the (B) becomes less than or greater than 1.0 there is a preferential adsorption by the adsorbent for one component with respect to the other. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Ideally desorbent materials should have a selectivity equal to about 1 or slightly less than 1 with respect to all extract components so that all of the extract components can be desorbed as a class with reasonable flow rates of desorbent material, and so that extract components can displace material in a subsequent adsorption step. While separation of an extract component from a raffinate component is theoretically possible when the selectivity of the adsorbent for the extract component with respect to the raffinate component is greater than 1, it is preferred that such selectivity approach a value of 2. Like relative volatility, the higher the selectivity the easier the separation is to perform. Higher selectivities permit a smaller amount of adsorbent to be used. The third important characteristic is the rate of exchange of the extract component of the feed mixture material or, in other words, the relative rate of desorption of the extract component. This characteristic relates directly to the amount of desorbent material that must be employed in the process to recover the extract component from the adsorbent; faster rates of exchange reduce the amount of desorbent material needed to remove the extract component and therefore permit a reduction in the operating cost of the process. With faster rates of exchange, less desorbent material has to be pumped through the process and separated from the extract stream for reuse in the process.

A dynamic testing apparatus is employed to test various adsorbents with a particular feed mixture and desorbent material to measure the adsorbent characteristics of adsorptive capacity, selectivity and exchange rate. The apparatus consists of an adsorbent chamber of approximately 70 cc volume having inlet and outlet portions at opposite ends of the chamber. The chamber is contained within a temperature control means and, in addition, pressure control equipment is used to operate the chamber at a constant predetermined pressure. Quantitative and qualitative analytical equipment such as refractometers, polarimeters and chromatographs can be attached to the outlet line of the chamber and used to detect quantitatively or determine qualitatively one or more components in the effluent stream leaving the adsorbent chamber. A pulse test, performed using this apparatus and the following general procedure, is used to determine selectivities and other data for various adsorbent systems. The adsorbent is filled to equilibrium with a particular desorbent material by passing the desorbent material through the adsorbent chamber. At a convenient time, a pulse of feed containing known concentrations of a tracer and of a particular ketose or aldose or both all diluted in desorbent is injected for a duration of several minutes. Desorbent flow is resumed, and the tracer and sugars are eluted as in a liquid-solid chromatographic operation. The effluent can be analyzed on-stream or alternatively effluent samples can be collected periodically and later analyzed separately by analytical equipment and traces of the envelopes of corresponding component peaks developed.

From information derived from the test adsorbent performance can be rated in terms of void volume, retention volume for an extract or a raffinate component, selectivity for one component with respect to the other, and the rate of desorption of an extract component by the desorbent. The retention volume of an extract or a raffinate component may be characterized by the distance between the center of the peak envelope of an extract or a raffinate component and the peak envelope of the tracer component or some other known reference point. It is expressed in terms of the volume in cubic centimeters of desorbent pumped during this time interval represented by the distance between the peak envelopes. Selectivity, (B), for an extract component with respect to a raffinate component may be characterized by the ratio of the distance between the center of the extract component peak envelope and the tracer peak envelope (or other reference point) to the corresponding distance between the center of the raffinate component peak envelope and the tracer peak envelope. The rate of exchange of an extract component with the desorbent can generally be characterized by the width of the peak envelopes at half intensity. The narrower the peak width the faster the desorption rate. The desorption rate can also be characterized by the distance between the center of the tracer peak envelope and the disappearance of an extract component which has just been desorbed. This distance is again the volume of desorbent pumped during this time interval.

The adsorbent may be employed in the form of a dense compact fixed bed which is alternatively contacted with the feed mixture and desorbent materials. In the simplest embodiment of the invention the adsorbent is employed in the form of a single static bed in which case the process is only semi-continuous. In another embodiment a set of two or more static beds may be employed in fixed-bed contacting with appropriate valving so that the feed mixture is passed through one or more adsorbent beds while the desorbent materials can be passed through one or more of the other beds in the set. The flow of feed mixture and desorbent materials may be either up or down through the desorbent. Any of the conventional apparatus employed in static bed fluid-solid contacting may be used.

Countercurrent moving-bed or simulated moving-bed countercurrent flow systems, however, have a much greater separation efficiency than fixed adsorbent bed systems and are therefore preferred. In the moving-bed or simulated moving-bed process the adsorption and desorption operations are continuously taking place which allows both continuous production of an extract and a raffinate stream and the continual use of feed and desorbent streams. One preferred embodiment of this process utilizes what is known in the art as the simulated moving-bed countercurrent flow system. The operating principles and sequence of such a flow system are described in U.S. Pat. No. 2,985,589 incorporated herein by reference thereto. In such a system it is the progressive movement of multiple liquid access points down an adsorbent chamber that simulates the upward movement of adsorbent contained in the chamber. Only four of the access lines are active at any one time: the feed input stream, desorbent inlet stream, raffinate outlet stream, and extract outlet stream access lines. Coincident with this simulated upward movement of the solid adsorbent is the movement of the liquid occupying the void volume of the packed bed of adsorbent. So that countercurrent contact is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller may be provided to set and regulate these flow rates.

The active liquid access points effectively divided the adsorbent chamber into separate zones, each of which has a different function. In this embodiment of our process it is generally necessary that three separate operational zones be present in order for the process to take place although in some instances an optional fourth zone may be used.

The adsorption zone, zone 1, is defined as the adsorbent located between the feed inlet stream and the raffinate outlet stream. In this zone, the feed stock contacts the adsorbent, an extract component is adsorbed, and a raffinate stream is withdrawn. Since the general flow through zone 1 is from the feed stream which passes into the zone to the raffinate stream which passes out of the zone, the flow in this zone is considered to be a downstream direction when proceeding from the feed inlet to the raffinate outlet streams.

Immediately upstream with respect to fluid flow in zone 1 is the purification zone, zone 2. The purification zone is defined as the adsorbent between the extract outlet stream and the feed inlet stream. The basic operations taking place in zone 2 are the displacement from the non-selective void volume of the adsorbent of any raffinate material carried into zone 2 by the shifting of adsorbent into this zone and the desorption of any raffinate material adsorbed within the selective pore volume of the adsorbent or adsorbed on the surfaces of the adsorbent particles. Purification is achieved by passing a portion of extraction stream material leaving zone 3 into zone 2 at zone 2's upstream boundary, the extract outlet stream, to effect the displacement of raffinate material. The flow of material in zone 2 is in a downstream direction from the extract outlet stream to the feed inlet stream.

Immediately upstream of zone 2 with respect to the fluid flowing in zone 2 is the desorption zone or zone 3. The desorption zone is defined as the adsorbent between the desorbent inlet and the extract outlet stream. The function of the desorption zone is to allow a desorbent material which passes into this zone to displace the extract component which was adsorbed upon the adsorbent during a previous contact with feed in zone 1 in a prior cycle of operation. The flow of fluid in zone 3 is essentially in the same direction as that of zones 1 and 2.

In some instances an optional buffer zone, zone 4, may be utilized. This zone, defined as the adsorbent between the raffinate outlet stream and the desorbent inlet stream, if used, is located immediately upstream with respect to the fluid flow to zone 3. Zone 4 would be utilized to conserve the amount of desorbent utilized in the desorption step since a portion of the raffinate stream which is removed from zone 1 can be passed into zone 4 to displace desorbent material present in that zone out of that zone into the desorbtion zone. Zone 4 will contain enough adsorbent so that raffinate material present in the raffinate stream passing out of zone 1 and into zone 4 can be prevented from passing into zone 3 thereby contaminating extract stream removed from zone 3. In the instances in which the fourth operational zone is not utilized the raffinate stream passed from zone 1 to zone 4 must be carefully monitored in order that the flow directly from zone 1 to zone 3 can be stopped when there is an appreciable quantity of raffinate material present in the raffinate stream passing from zone 1 into zone 3 so that the extract outlet stream is not contaminated.

A cyclic advancement of the input and output streams through the fixed bed of adsorbent can be accomplished by utilizing a manifold system in which the valves in the manifold are operated in a sequential manner to effect the shifting of the input and output streams thereby allowing a flow of fluid with respect to solid adsorbent in a countercurrent manner. Another mode of operation which can effect the countercurrent flow of solid adsorbent with respect to fluid involves the use of a rotating disc valve in which the input and output streams are connected to the valve and the lines through which feed input, extract output, desorbent input and raffinate output streams are advanced in the same direction through the adsorbent bed. Both the manifold arrangement and disc valve are known in the art. Specifically rotary disc valves which can be utilized in this operation can be found in U.S. Pat. Nos. 3,040,777 and 3,422,848. Both of the aforementioned patents disclose a rotary type connection valve in which the suitable advancement of the various input and output streams from fixed sources can be achieved without difficulty.

In many instances, one operational zone will contain a much larger quantity of adsorbent than some other operational zone. For instance, in some operations the buffer zone can contain a minor amount of adsorbent as compared to the adsorbent required for the adsorption and purification zones. It can also be seen that in instances in which desorbent is used which can easily desorb extract material from the adsorbent that a relatively small amount of adsorbent will be needed in a desorption zone as compared to the adsorbent needed in the buffer zone or adsorption zone or purification zone or all of them. Since it is not required that the adsorbent be located in a single column, the use of multiple chambers or a series of columns is within the scope of the invention.

It is not necessary that all of the input or output streams be simultaneously used, and in fact, in many instances some of the streams can be shut off while others effect an input or output of material. The apparatus which can be utilized to effect the process of this invention can also contain a series of individual beds connected by connecting conduits upon which are placed input or output taps to which the various input or output streams can be attached and alternately and periodically shifted to effect continuous operation. In some instances, the connecting conduits can be connected to transfer taps which during the normal operations do not function as a conduit through which material passes into or out of the process.

It is contemplated that at least a portion of the extraction output stream will pass into a separation means wherein at least a portion of the desorbent material can be separated to produce an extract product containing a reduced concentration of desorbent material. Preferably, but not necessary to the operation of the process, at least a portion of the raffinate output stream will also be passed to a separation means wherein at least a portion of the desorbent material can be separated to produce a desorbent stream which can be reused in the process and a raffinate product containing a reduced concentration of desorbent material. The separation means will typically be a fractionation column, the design and operation of which is well known to the separation art.

Although both liquid and vapor phase operations can be used in many adsorptive separation processes, liquid-phase operation is preferred for this process because of the lower temperature requirements and because of the higher yield of extract product that can be obtained with liquid-phase operation over those obtained with vapor-phase operation. Adsorption conditions will include a temperature range of from about 20° C. to about 200° C. with about 20° C. to about 100° C. being more preferred and a pressure range of from about atmospheric to about 500 psig. with from about atmospheric to about 250 psig. being more preferred to insure liquid phase. Desorption conditions will include the same range of temperatures and pressures as used for adsorption conditions.

The size of the units which can utilize the process of this invention can vary anywhere from those of pilot-plant scale (see for example our assignee's U.S. Pat. No. 3,706,812) to those of commercial scale and can range in flow rates from as little as a few cc. an hour up to many thousands of gallons per hour.

The following examples are given to illustrate the process of this invention, however, it is to be understood that these examples are given merely for purposes of illustration, and that the present invention is not necessarily limited thereto.

EXAMPLE I

A shaped replication support was prepared by calcining ⅛ inch diameter alumina spheres at a temperature of about 480° C. for a period of 2 hours. Following this, the spheres were placed in an inert atmosphere of nitrogen and a carbonaceous pyropolymer layer was deposited on these spheres by pyrolizing benzene in the presence of said spheres at a temperature of about 790° C. in said inert atmosphere.

The resulting composite material was then leached by immersion in a 96% phosphoric acid solution at a temperature of about 160° C. for a period of 24 hours. The resulting shaped replicate of particle aggregates comprising a carbonaceous pyropolymer structure possessing recurring units of at least carbon and hydrogen atoms was analyzed and it was found that essentially all of the alumina had been removed in the leach.

The shaped replicates prepared according to the above paragraph were utilized in a pulse-test to illustrate the ability of these adsorbents to act as a selective adsorbent for the separation of sucrose from a mixture containing glucose, fructose, and sucrose. A series of tests were performed to additionally indicate the advantage of utilizing an aqueous alcoholic solution as the desorbent material for the recovery of sucrose from the aforesaid mixture. In these tests 70 cc. of the shaped replicate adsorbent were tested by passing a solution of mixed sugars containing 5% by weight of sucrose, 5% by weight of fructose, 5% by weight of glucose over the adsorbent. In the first test the desorbent material consisted of deionized water. However, due to the slow desorption of sucrose it was not possible to establish a half-width value and consequently a retention volume could not be measured. However, in subsequent tests when utilizing an aqueous alcoholic solution as the desorbent material the half-widths of the three components were developed from the chromatographic analysis of the effluent samples that were collected during the course of the test. The retention volume for sucrose was calculated by measuring the distance from time zero or the reference point to the midpoint of the sucrose peak and subtracting the distance representing the void volume of the adsorbent which was obtained by measuring the distance from the same reference point to the midpoint of the tracer used to determine the void volume. The void volume was determined by filling the hydrophobic pores of the adsorbent with acetone then passing a 10 cc. pulse of feed containing 20% $D_2O$ in water. This was followed with water desorbent. The midpoint of the $D_2O$ peak envelope established the void volume.

In a similar manner retention volumes for fructose and glucose were also obtained. The selectivities of the adsorbent for sucrose with respect to glucose and fructose are the quotients obtained by dividing the sucrose retention volume by the glucose retention volume and the fructose retention volume respectively.

In the second test the desorbent which was utilized comprised an aqueous methanol solution containing 20% by weight of methanol. The solution was passed over the shaped replicate adsorbent and thereafter was desorbed by passing the desorbent material over the adsorbent.

In a similar manner the adsorbent material, after passage of the solution over said adsorbent, was treated with a desorbent material comprising an aqueous ethanol solution containing 20% by weight of ethanol. The results of these tests are set forth in Table I below in which the aqueous methanol solution is labeled A and the aqueous ethanol solution is labeled B.

TABLE I

| | A | B |
|---|---|---|
| HALF WIDTHS | | |
| Fructose | 12.88 cc. | 13.50 cc. |
| Glucose | 13.02 cc. | 12.2 cc. |
| Sucrose | 21.6 cc. | 15.6 cc. |
| RETENTION VOLUMES | | |
| Fructose | 13.3 cc. | 3.1 cc. |
| Glucose | 12.9 cc. | 2.2 cc. |
| Sucrose | 41.95 cc. | 5.5 cc. |
| SELECTIVITIES | | |
| Sucrose/Fructose | 3.1 | 1.8 |
| Sucrose/Glucose | 3.3 | 2.5 |

EXAMPLE II

In a manner similar to that set forth in Example I above shaped replication supports was prepared by treating calcined alumina spheres with benzene at pyrolysis conditions which included a temperature of about 790° C. in an inert atmosphere of nitrogen. The composite material was then leached by immersion in a 96% phosphoric acid solution at a temperature of about 160° C. for a period of 24 hours. The resulting shaped replicate of particle aggregates comprising a carbonaceous pyropolymer structure possessing recurring units of at least carbon and hydrogen atoms was used as an adsorbent for a synthetic molasses solution. The synthetic molasses solution comprised a mixture of 10% potassium chloride, 10% betaine, and 30% sucrose. This solution was subjected to a pulse test in a manner similar to that set forth in Example I. In Test A, the desorbent material was water; in Test B the desorbent water material comprised an aqueous alcoholic solution comprising 10% methanol and in Test C the desorbent material comprised an aqueous alcoholic solution containing 10% ethanol. As in the previous test the synthetic molasses solution was pulsed over the adsorbent for a predetermined period following which the adsorbent was treated with the various desorbent materials. The results of these pulse tests are set forth in Table II below.

TABLE II

|  | A | B | C |
|---|---|---|---|
| HALF WIDTHS |  |  |  |
| KCl | 7.8 cc | 8.6 cc | 10.2 cc |
| Betaine | 7.4 cc | 11.3 cc | 13.6 cc |
| Sucrose | 14.2 cc | 16.2 cc | 16.7 cc |
| RETENTION VOLUMES |  |  |  |
| KCl | 2.24 cc | 3.13 cc | 1.71 cc |
| Betaine | 4.1 cc | 5.4 cc | 2.96 cc |
| Sucrose | 12.8 cc | 13.3 cc | 7.01 cc |
| SELECTIVITIES |  |  |  |
| Sucrose/KCl | 5.7 | 4.2 | 4.1 |
| Sucrose/betaine | 3.1 | 2.5 | 2.4 |

(based on 40 cc void volume)

We claim as our invention:

1. A process for separating sucrose from an aqueous mixture of a sugar source containing sucrose and at least one other sugar which comprises the steps of:
    (a) contacting said mixture at adsorbent conditions with an adsorbent comprising a shaped replication of inorganic support particle aggregates, said adsorbent consisting of a carbonaceous pyropolymer containing at least carbon and hydrogen atoms thereby selectively adsorbing said sucrose thereon;
    (b) separating from the adsorbent a raffinate stream comprising at least one other sugar;
    (c) contacting said adsorbent at desportion conditions with a desorbent material consisting essentially of an aqueous methanolic solution having from about 10% to about 50% methanol by weight to effect desorption of said sucrose from said adsorbent, and
    (d) separating and recovering from said adsorbent an extraction stream comprising said sucrose.

2. The process as set forth in claim 1 in which said adsorbent and desorption conditions include a temperature in the range of from about 20° to about 200° C. and a pressure in the range of from about atmospheric to about 500 psig.

3. The process as set forth in claim 1 in which said other sugars comprise glucose, fructose, and raffinose.

4. The process as set forth in claim 1 in which said sugar source is molasses.

* * * * *